(12) United States Patent
Jacobs et al.

(10) Patent No.: US 8,411,137 B2
(45) Date of Patent: Apr. 2, 2013

(54) DUAL PROJECTION SYSTEM WITH INVERSELY SYNCHRONIZED CHANNEL PROJECTIONS

(75) Inventors: Stephen M. Jacobs, Cupertino, CA (US); John Carey, Los Gatos, CA (US); Martin Richards, Redwood City, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 1237 days.

(21) Appl. No.: 12/174,532

(22) Filed: Jul. 16, 2008

(65) Prior Publication Data

US 2010/0013911 A1 Jan. 21, 2010

(51) Int. Cl.
*H04N 13/04* (2006.01)
(52) U.S. Cl. .......... 348/54; 348/42; 348/333.1; 348/744
(58) Field of Classification Search .................. None
See application file for complete search history.

(56) References Cited

U.S. PATENT DOCUMENTS

| 2,729,138 | A | | 1/1956 | Bernier | |
|---|---|---|---|---|---|
| 5,361,106 | A | * | 11/1994 | Ashbey | 352/57 |
| 6,540,363 | B1 | * | 4/2003 | Steffensmeier | 353/31 |
| 6,789,931 | B2 | * | 9/2004 | Pinho | 362/551 |
| 8,172,399 | B2 | * | 5/2012 | DeCusatis et al. | 353/8 |
| 2003/0020809 | A1 | * | 1/2003 | Gibbon et al. | 348/51 |
| 2007/0052934 | A1 | | 3/2007 | Widdowson | |
| 2008/0278807 | A1 | | 11/2008 | Richards et al. | |
| 2008/0284982 | A1 | | 11/2008 | Richards et al. | |
| 2009/0268102 | A1 | * | 10/2009 | Barazza | 348/744 |
| 2010/0060857 | A1 | | 3/2010 | Richards | |
| 2010/0066976 | A1 | | 3/2010 | Richards | |
| 2010/0067108 | A1 | | 3/2010 | Richards | |
| 2010/0073769 | A1 | | 3/2010 | Richards | |

FOREIGN PATENT DOCUMENTS

| DE | 10359788 A1 | | 4/2005 |
|---|---|---|---|
| JP | 2009108999 A | * | 5/2009 |
| JP | 2009116099 A | * | 5/2009 |
| JP | 2009122430 A | * | 6/2009 |
| WO | 2007070245 A | | 6/2007 |
| WO | 2008048480 | | 4/2008 |

OTHER PUBLICATIONS

EPO, International Search Report mailed Nov. 19, 2009 in re International Application No. PCT/US2009/050148.

* cited by examiner

*Primary Examiner* — Jeffrey R Swearingen (57) ABSTRACT

A dual projection system utilizes a first projector and a second projector to project alternating left and right channel images of a 3D display. The projectors are inversely synchronized such that while the first projector projects a right channel image the other projector projects a left channel image. A projection filter in each projector has left channel properties when the image being projected is a left channel image and right channel properties when the image being projected is a right channel image. The images projected from each projector alternate between left and right channel images approximately once per frame.

51 Claims, 7 Drawing Sheets

DUAL PROJECTION SYSTEM WITH INVERSELY SYNCHRONIZED CHANNEL PROJECTIONS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of Invention

The present invention relates to 3D systems, and more particularly to 3D projection systems such as those used in cinema systems.

2. Description of Related Art

Various methods are in place for 3D stereoscopic projection, including Anaglyph, Linear Polarization, Circular Polarization, Shutter Glasses, and Spectral Separation. Anaglyph is the oldest technology, and provides left/right eye separation by filtering the light through a two color filter, commonly red for one eye, and cyan for the other eye. At the projector, the left eye image is (commonly) filtered through a red filter, and the right image filtered through a cyan filter. The eyewear consists of a red filter for the left eye, and a cyan filter for the right eye. This method works best for black and white original images, and is not well suited for color images.

Linear Polarization 3D provides separation at the projector by filtering the left eye through a linear polarizer (commonly) oriented vertically and filtering the right eye image through a linear polarizer oriented horizontally. The eyewear consists of a vertically oriented linear polarizer for the left eye and a horizontally oriented polarizer for the right eye. The projection screen is of the polarization preserving type, commonly referred to as a "silver screen" because of its distinctive color. Linear Polarization allows a full color image to be displayed with little color distortion. It has several problems, these include the need for a silver screen which is expensive, fragile, and not uniform. Another problem is that the viewer must keep his head oriented vertically to avoid crosstalk from one eye to another.

Circular Polarization 3D was invented to address the problem of requiring the viewer to keep his head oriented vertically. Circular Polarization provides separation at the projector by filtering the left eye image through a (commonly) left handed circular polarizer, and filtering the right eye image through a right handed circular polarizer. The eyewear consists of a left handed circular polarizer for the left eye and a right handed circular polarizer for the right eye. A silver screen is also needed for this approach.

Shutter Glasses provides separation by multiplexing the left and right images in time. A filter for separation at the projector is not required. The eyewear consists of active glasses that electronically shutter the lens in synchrony with the projector frame rate. The left eye image is first displayed, followed by the right eye image etc. Since having a direct wired connection to the Glasses in a theatre is impractical, a wireless or infrared signaling method is used to provide a timing reference for the left/right eye shuttering.

Spectral separation provides separation at the projector by filtering the left and right eye spectrally. The system differs from anaglyph in that the filters for the left and right eye each pass a portion of the red, green, and blue spectrum, providing for a full color image. The band pass spectrum of the left eye filter is complementary to the band pass spectrum of the right eye filter. The eyewear consists of filters with the same general spectral characteristics as are used in the projector. While this method provides a full color image, it requires color compensation to make the colors in the left and right eye match the colors that were present in the original image, and there is a small reduction in the color gamut compared to the gamut of the projector.

The projectors themselves take on various forms, including LCD (liquid crystal display) projectors which usually contain three separate LCD glass panels, one each primary color component of a image to be projected. The LCD panels modulate the light and produces the image that is projected onto the screen.

DLP ("Digital Light Processing") is a proprietary technology developed by Texas Instruments. The DLP chip is a reflective surface made up of thousands of tiny mirrors. In higher quality DLP projectors, there are three separate DLP chips, one for each for the red, green, and blue channels. Typically, a prism separates light from a projection lamp into red, green, and blue colored light which then separately illuminate "red," "green," and "blue" DLP chips which modulate the primary colored lights according to the corresponding primary color components of an image signal. After modulation, the now modulated primary colored lights are recombined and projected onto a viewing screen.

Other, and less expensive, applications of DLP include projectors with a single DLP chip used in conjunction with a color wheel that consists of red, green, blue, and sometimes white (clear) filters. The color wheel spins between a projection lamp and the DLP chip—alternating the color of the light illuminating the chip. The alternating colors of the light illuminating the DLP chip are modulated and projected on a viewing screen in sequence. The sequentially modulated and projected lights then form a full color image when viewed.

Including the above noted filtering technologies, there are currently two main digital 3D projection systems: one that uses dual-projectors with static filtering and another that uses a single-projector with active filtering (e.g., a filter that changes properties over time).

Figure 1:
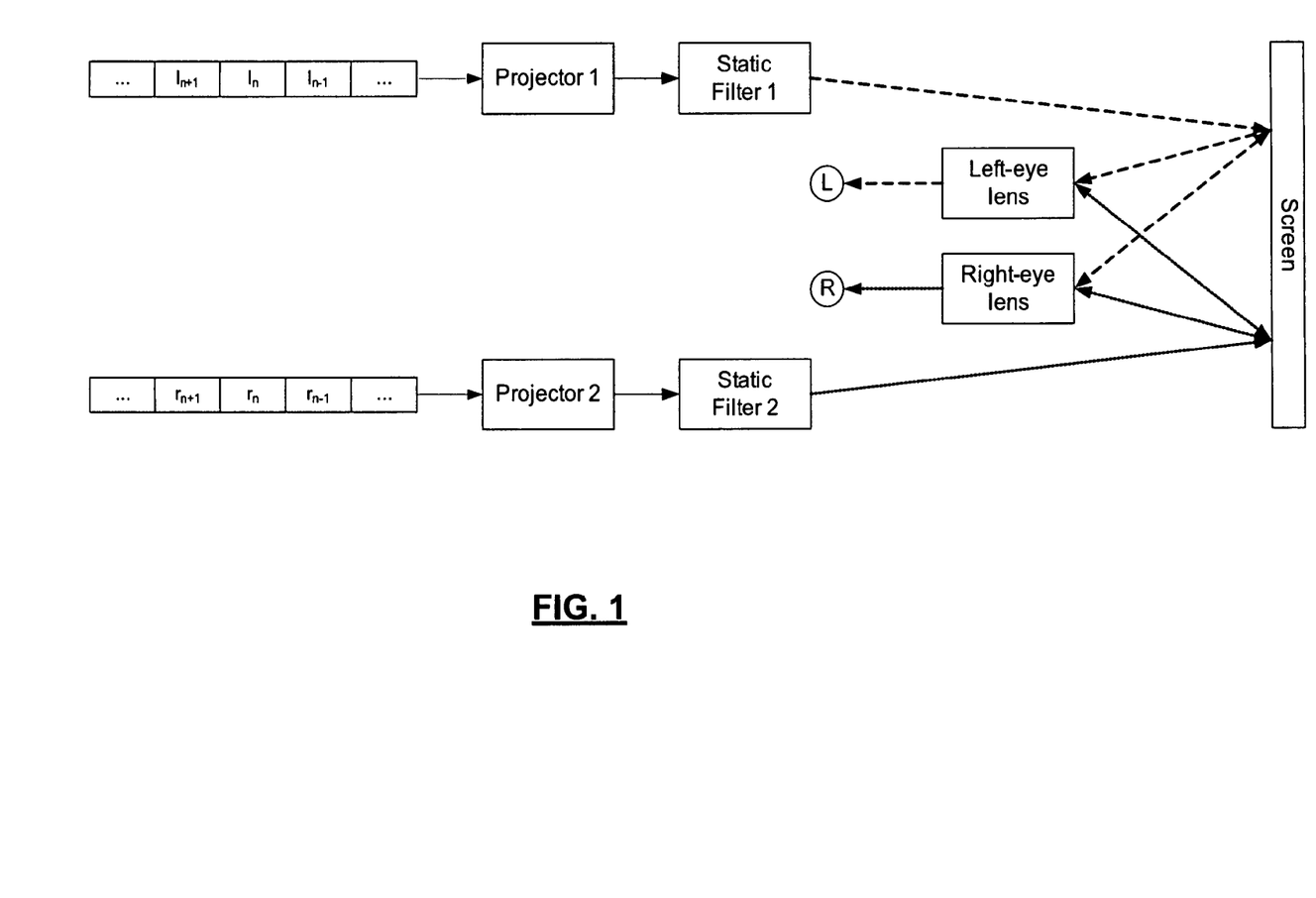
FIG. 1 is a diagram of a passive dual-projector system.

FIG. 1 shows a diagram of a passive dual-projector system. As shown in FIG. 1, one projector projects the left eye image onto the screen while the other projector projects the right eye image onto the screen. Both projectors project a continuous stream of images, such that at all times, both the left and right eye images are projected to the screen.

The left eye image is projected from projector 1 and passes through static filter 1 on the way to the screen, and the right eye image is projected from projector 2 and passes through static filter 2 on the way to the screen. Static filters 1 and 2 are chosen such that their properties produce mutually exclusive channels, and, as such, an image passing through both static filters 1 and 2, in any order results in little or no light being present at the output of the filters.

After passing through the filters, the filtered left and right eye images reflect off the screen and arrive at the viewer, who is wearing special glasses with filtered lenses whose characteristics match the characteristics of the filters of the projectors. The left eye image passes through the left eye lens, but the right eye image is blocked by the left eye lens. Similarly, the right eye image passes through the right eye lens, but the left eye image is blocked by the right eye filtered lens. Therefore, the left eye receives only the left eye image and the right eye receives only the right eye image, creating the stereoscopic 3D effect.

Figure 2:
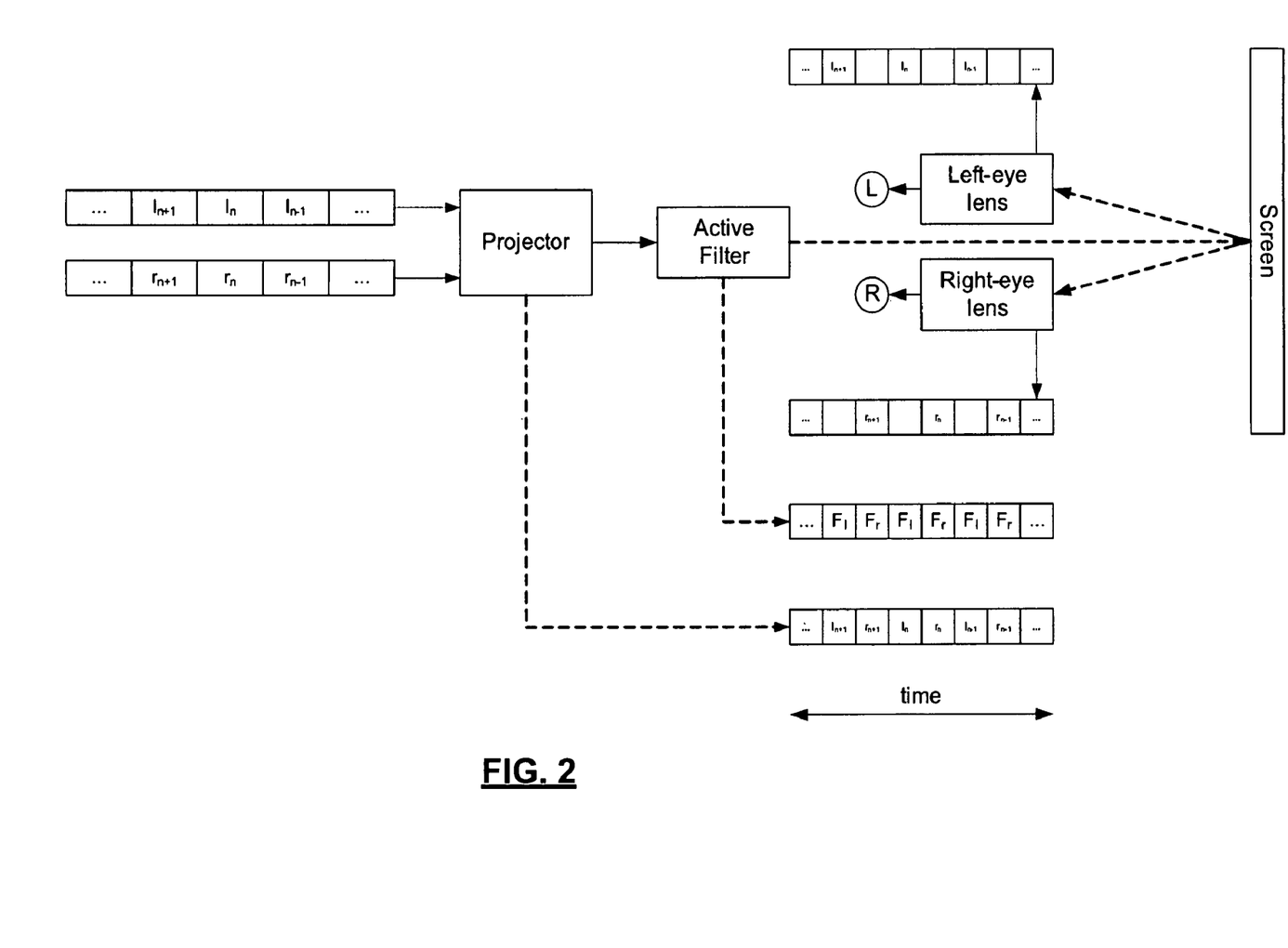
FIG. 2 is a diagram of an active single projector stereoscopic projection system.

FIG. 2 shows a diagram of an active single projector stereoscopic projection system. As shown in FIG. 2, the left and right eye images are interleaved and projected from the same projector. One image, corresponding to either the left eye or the right eye, is projected on screen at any given time. The interleaved stream of left and right eye images is projected by the projector and passes through a time dependent filter on the way to the screen.

As in the passive dual-projector system, in order to create the stereoscopic 3D effect, the images for the left eye pass through a different filter than the images for the right eye. However, unlike the passive dual-projector system where each image takes a separate path to the screen and thus passes through a completely separate filter, in the single projector case both the left and right images take the same path to the screen. Therefore, in the described single projector system, in order to enable the stereoscopic 3D effect, the characteristics of the filter in the path are actively controlled to change with time so that the image passes through a filter whose characteristics correspond to the eye which is being projected. It should be noted that although the filters have been shown in the figures as separate from the projectors, in practical systems the filters are integrated within the projector.

SUMMARY OF THE INVENTION

The present inventors have realized the need to create a dual-projector 3D projection system in which the projectors operate independently and in a manner which retains and/or improves on the benefits and reduces the disadvantages of existing systems. This includes the need to project images without flicker and the desirability of reducing reliance on current methods for flicker reduction.

In one embodiment, the present invention provides two active single-projector systems installed as a dual-projector system in which both projectors operate identically for robustness and increased brightness.

In another embodiment, the present invention provides a 3D dual projection system wherein both projectors have active filters with similar left and right channel filtering characteristics but are inversely synchronized (synchronized 180 degrees out of phase).

In various embodiments, the filters are, for example, one of spectral separation filters, polarization filters, or filters based on another filtering technique suitable to provide channel separation in projected 3D images. The specific characteristics of the filters are not critical to the invention, but in one embodiment, the filters are spectral separation filters having mutually exclusive sub-primary passbands.

The present invention may be embodied as a projection system, comprising, a first projector configured to alternately project at least one first channel image and then at least one second channel image, and a second projector configured to alternately project at least one second channel image and then at least one first channel image. In one embodiment, the first channel comprises a right channel of a 3D image and the second channel comprises a left channel of the 3D image. In addition, or alternatively, the first projector and the second projector are inversely synchronized such that when one projector is projecting a first channel image the other projector is projecting a second channel image and visa versa.

In one embodiment, the first projector comprises a first spinning filter wheel comprising a first channel filter and a second channel filter, and the second projector comprises a second spinning wheel filter comprising a first channel filter and a second channel filter, wherein the first channel filter and the second channel filter do not spin in synchronicity. In various embodiments, the first channel filter and the second channel filter are out of phase (e.g., 180 degrees out-of-phase).

In various embodiments, the channel filters comprise any of spectral separation filters or polarization filters (e.g., left and right circular polarization filters). Various other configurations of filters including passbands, guard bands, and blocking bands may also be utilized.

In various embodiments, the alternation between left and right channel images occurs approximately once per frame change. In other embodiments, the alternation between left and right channel images occurs more than once per frame change.

The invention may also be embodied as a method for stereoscopic three-dimensional projection comprising the steps of receiving, a first sequence of images intended for reception by a viewer's left eye, receiving a second sequence of images intended for reception by a viewer's right eye, generating a third sequence of images comprising alternating images from said first and said second sequences of images, filtering said third sequence of images using a first actively controlled filter with at least two states, projecting from a first projector the filtered third sequence of images, controlling the first actively controlled filter so as to be in a first state when said first projector is projecting an image from said first sequence and in a second state when said first projector is projecting an image from said second sequence, generating a fourth sequence of images comprising alternating images from said first and said second sequences of images, filtering said fourth sequence of images using a second actively controlled filter with at least two states, projecting from a second projector the filtered fourth sequence of images, and controlling the second actively controlled filter so as to be in a first state when said second projector is projecting an image from said first sequence and in a second state when said second projector is projecting an image from said second sequence. In various embodiments, the fourth sequence of images differs from said third sequence of images.

Portions of both the system and/or any devices derived therefrom and the method may be conveniently implemented in programming on a general purpose computer, or networked computers, and the results may be displayed or projected onto an output device (e.g., white screen, silver screen, display panel, etc.), or transmitted to a remote device for output or display. In addition, any components of the present invention represented in a computer program, data sequences, and/or control signals may be embodied as an electronic signal broadcast (or transmitted) at any frequency in any medium including, but not limited to, wireless broadcasts, and transmissions over copper wire(s), fiber optic cable(s), and co-ax cable(s), etc.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

As noted above, the present inventors have realized the need to improve 3D projection systems, including improving the benefits and reducing disadvantages of existing systems. For example, one advantage of existing passive dual-projector systems is that the image for each eye is projected on the screen at all times (save frame change periods, flash intervals, etc). Therefore, flicker problems that arise in active single-projector systems are not present. Another advantage is that because each projector uses a static filter, there is no need for active control of the filters.

However, a major drawback of the passive dual-projector system is that it is very susceptible to differences in the light intensity output from each projector. Even relatively small differences in intensity between projectors can lead to noticeable degradation of the stereoscopic 3D effect. Another drawback of the passive dual-projector system is that if one projector fails, the image for the eye corresponding to that projector is lost, completely destroying the stereoscopic 3D effect.

In single projector systems, projectors typically alternate between projecting the left and right eye images, and, at any given time one eye will receive no image. Therefore, the sequence of images received by either eye will consist of alternating light (image) and dark (no image) sections. If the duration of the dark sections is too long, the images received by each eye will appear to flicker. Flicker becomes apparent, particularly in designs such as that shown in FIG. 2, where the left eye image is projected during the first half of the frame, and the right eye image is projected during the second half of the frame. This is because dichoptic flicker (flicker from alternating eyes, e.g., different stimulus to each eye) has a higher fusion frequency than monocular flicker (both eyes at once).

In order to reduce the perceptibility of flicker, double or triple flash techniques are often used. In the double flash case, the image from each eye is projected twice during the frame. For example, the left eye image is projected for the first quarter of the frame, then the right eye image is projected for the second quarter of the frame, then the left eye image is projected again for the third quarter of the frame, and finally the right eye image is projected again for the last quarter of the frame. While each eye still receives alternating light and dark sections, the maximum duration of any dark section is cut in half, which reduces flicker artifacts.

Triple flash operates similarly, but instead of twice per frame, the image for each eye is projected three times per frame. This reduces even further the maximum duration of any dark section. While higher-order flashing is possible, triple flash is typically sufficient to make flickering imperceptible in most cases.

With these circumstances and issues at hand, the present inventors have determined a more efficient and optically robust 3D system. Referring again to the drawings, wherein like reference numerals designate identical or corresponding parts, and more particularly to FIG. 3 thereof, there is illustrated a diagram of an active dual-projection system 300 according to an embodiment of the present invention. A first projector 310 is provided or otherwise accepts a first stream of alternating left and right channel images for projection. A second projector 320 is provided or otherwise accepts a second stream of alternating left and right channel images for projection. The second stream is inverse to the first stream (meaning that where the first stream contains a left channel image, a corresponding position in the second stream contains a right channel image). Alternatively, the projectors receive a same sequence of left and right channel images which are then are inversely "flashed" according to a flash format of the projector.

Figure 3:
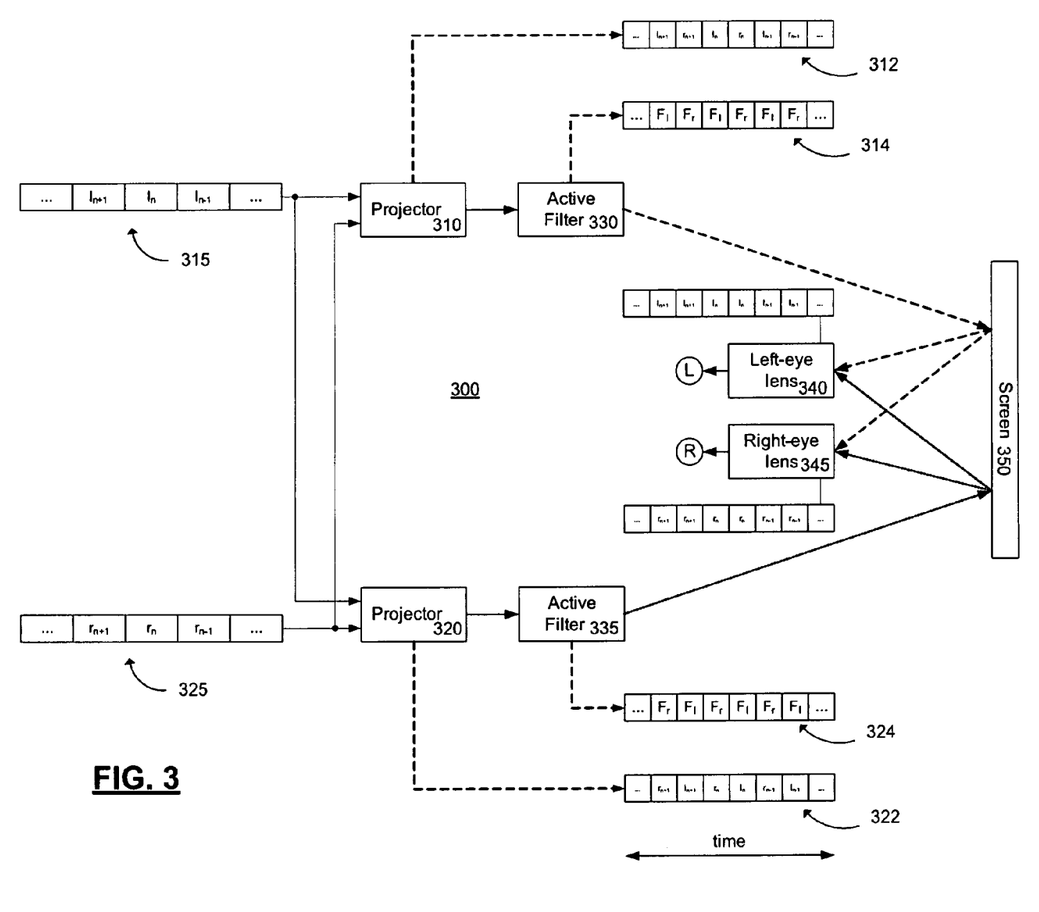
FIG. 3 is a diagram of an active dual-projection system according to an embodiment of the present invention.

At any given time, one of the projectors 310/320 projects the left-eye image while the other projector projects the right-eye image. As a result, like with the passive dual-projector system, at any given time both images are being projected, and the flicker issues which can arise in the active single-projector system are not present. However, unlike the passive dual-projector system in which one projector always projects the left-eye image and the other projector always projects the right-eye image, according to the current invention each projector alternates between the left and right eye images.

For example, at a given time, projector 310 is projecting a left eye image, and projector 320 is projecting a right eye image. At a later time, projector 310 switches to projecting the right eye image, and at the same time, projector 320 switches to projecting the left eye image. At a still later time, projector 310 switches back to projecting the left eye image, and at the same time, projector 320 switches back to projecting the right eye image. The projectors continue alternating between images at regular or irregular intervals. The frequency at which the projectors alternate between images is not critical to the practice of the invention since at any given time, the image for each eye will be projected. However, in a preferred embodiment the projectors alternate between the left and right eye images at least once per frame. The images themselves may be intended as a full frame for projection or some variant, such as, for example, a first or second half portion of a frame (e.g., one projector projecting the first half of the frame and the second projector projecting the same image in the second half of the frame), essentially alternating at more than once per frame.

FIG. 3 also illustrates an exemplary left and right channel alternation sequences 312 and 322 alternating between left (l) and right (r) channel images (or left and right eye images) of frames of a motion picture (e.g., $r_{n-1}$—right channel image, frame n−1; $l_n$—left channel image, frame n) wherein projectors 310 (P310) and 320 (P320) projects the left and right channel images as follows:

P310: $r_{n-1}, l_{n-1}, r_n, l_n, r_{n+1}, l_{n+1}, \ldots$ (312)
P320: $l_{n-1}, r_{n-1}, l_n, r_n, l_{n+1}, r_{n+1}, \ldots$ (322)

Another possible sequence is, for example:

P310: $r_{n-1}, l_n, r_{n+1}, \ldots$
P320: $l_{n-1}, r_n, l_{n+1}, \ldots$

Another important difference between the current invention and the passive dual-projector system is the control of the filters. Unlike the passive dual-projector system, in which the filter for each projector is fixed, according to the current invention the projectors actively alternate between the left and right channel filters depending on which image they are projecting. For example, at a given time, projector 310 is projecting the left eye (or left channel) image and therefore active filter 330 is set to a left eye (or left channel) projection filter. At the same time, projector 320 is projecting a right eye (or right channel) image and active filter 335 is set to a right eye (or right channel) projection filter.

At a later time, projector 310 switches to projecting the right eye image and the projector's active filter 330 is switched to the right eye projection filter. At the same time, projector 320 switches to projecting the left eye image and the projector's active filter 335 is switched to the left eye projection filter.

Finally, at a still later time, projector 310 switches back to projecting the left eye image and projector 310's active filter 330 is switched back to the left eye projection filter. At the same time, projector 320 switches back to projecting the right eye image and projector 320's active filter 335 is switched back to the right eye projection filter.

The projection of alternating images and corresponding switching of the projection filters (e.g., $F_r$—right projection filter, $F_l$—left projection filter) may be illustrated, for example, as follows:

P310: $r_{n-1}$ ($F_r$), $l_{n-1}$ ($F_l$), $r_n$ ($F_r$), $l_n$ ($F_l$), $r_{n+1}$ ($F_r$), $l_{n+1}$ ($F_l$), . . . (image sequence 312 and projection filter sequence 314 combined).

P320: $l_{n-1}$ ($F_l$), $r_{n-1}$ ($F_r$), $l_n$ ($F_l$), $r_n$ ($F_r$), $l_{n+1}$ ($F_l$), $r_{n+1}$ ($F_r$), . . . (image sequence 322 and projection filter sequence 324 combined).

The process of switching back and forth between left and right eye images and corresponding left and right eye projection filters in both projectors continues until the end of the available left and right images. Again, it should be understood that the frequency at which the projectors alternate between left and right channel projection filters is not critical to the practice of the invention, provided that they alternate at the same frequency as (and in unison with) projections of the left and right eye images.

Using a similar approach and synchronization of the projection filter to the image being projected, an embodiment of a dual projection system according to the invention may project any of, for example, the 1:1 to 6:2 formats shown in Table 1 (or other formats).

TABLE 1

| FORMAT | FRAME 1 (F1) | FRAME 2 (F2) | (F3) | (F4) |
|---|---|---|---|---|
| 1:1 (1x flash) | L1 | R2 | L3 | R4 |
| 2:2 | L1, R1 | L2, R2 | L3, R3 | L4, R4 |
| 4:2 (2x flash) | L1, R1, L1, R1 | L2, R2, L2, R2 | . . . | . . . |
| 5:2 | L1, R1, L1, R1, L1 | R2, L2, R2, L2, R2 | . . . | . . . |
| 6:2 (3x flash) | L1, R1, L1, R1, L1, R1 | L2, R2, L2, R2, L2, R2 | . . . | . . . |

For example, in either a single projector or dual projector system, a 4:2 double (2×) flash arrangement provides that, in a first frame time slot, a first projector is configured to flash both a left channel image (e.g., L1=Left Channel, frame 1) and right channel image (e.g. R1=Right channel, frame 1) twice (a total of 4 flashes in each frame), each flash synchronized with a corresponding left or right channel projection filter.

In a dual projection embodiment of the present invention, a second projector also flashes left and right channel images twice, which are also synchronized to a corresponding left or right channel projection filter. But the frame images flashed by the second projector are inversely synchronized to the frame images flashed by the first projector (when the first projector flashes a left channel image, the second projector flashes a right channel image). If the chosen frame/flash sequences (or format) of the first projector are as stated in Table 1, then the second projector's frame/flash sequences (including left/right channel projections), comprise, for example, the sequences as listed in Table 2.

TABLE 2

| FORMAT | FRAME 1 (F1) | FRAME 2 (F2) | (F3) | (F4) |
|---|---|---|---|---|
| 1:1 (1x flash) | R1 | L2 | R3 | L4 |
| 2:2 | R1, L1 | R2, L2 | R3, L3 | R4, L4 |
| 4:2 (2x flash) | R1, L1, R1, L1 | R2, L2, R2, L2 | . . . | . . . |
| 5:2 | R1, L1, R1, L1, R1 | L2, R2, L2, R2, L2 | . . . | . . . |
| 6:2 (3x flash) | R1, L1, R1, L1, R1, L1 | R2, L2, R2, L2, R2, L2 | . . . | . . . |

Regardless of the format utilized, the alternating left and right images are ultimately projected onto a viewing screen (e.g., screen 350) for viewing by a viewer. In several embodiments, including those using spectral separation to distinguish left and right channels (i.e., spectral separation projection filters), the screen itself is, for example, a white screen already installed and currently being used in modern cinema theaters. In other embodiments, such as embodiments using polarization based projection filters, the screen is a specialized "silver screen" which preserves the polarization and/or the relative polarizations of light reflected from the screen so as to maintain separate channel characteristics.

As illustrated in FIG. 3, a left eye lens 340 comprises a left eye (or left channel) viewing filter that encompasses passbands of the left eye projection filters. The viewer's left eye then receives the left eye images projected from either projector 310 or projector 320. A right eye lens 345 comprises a right eye (or right channel) viewing filter that encompasses passbands of the right eye projection filters. The viewer's right eye then receives the right eye images projected from either projector 310 or projector 320.

Encompassing the passbands of a projection filter may include passbands beyond the passbands of the projection filters or exclude some wavelengths in the passbands of the projection filters in cases where viewing angles, reflections from the screen, or other factors alter the channel characteristics when viewed by a viewer. Accounting for changes in polarization, wavelength (e.g., blue shifting), or other channel characteristics, depending upon the separation technology(ies) utilized, the viewing filters (e.g., left and right eye viewing filters) are constructed to pass only one of the projected channels at a point where the channels are viewed by a viewer.

It can be shown that, for the current invention, differences in luminosity between projectors do not significantly degrade the resulting image. To illustrate this, consider three cases: one in which the luminosities of the two projectors are equal, and another in which one projector is completely off. When the two projectors are at equal luminosity, the system's brightness and image quality is equivalent or better than that of a perfectly tuned passive dual-projector system.

In the case where one projector is off, the total luminosity will be reduced from that of the optimal case, but because the remaining projector is operating as an independently functional active single-projector system, the viewer will still view a quality image and experience the stereoscopic 3D effect, but with a lower overall luminosity, and possible flickering, depending on how often the left and right eye images alternate. Finally, for any case in between the two cases discussed above, the user will still experience the stereoscopic 3D effect, with an overall luminosity somewhere between the two edge cases, and possible flickering, depending on how often the left and right eye images alternate and also on the extent of the difference in luminosity between the two projectors.

Using the preceding argument, it can also be understood that the invention is much more robust to projector failure than both the passive dual-projector case and the active single-projector case. The case presented above in which one projector is completely off is equivalent to a scenario where one of the projectors fails. In this scenario, according to the current invention, the viewer still experiences the stereoscopic 3D effect, but with a lower overall luminosity, and possible flickering, while for an active single-projector system the viewer sees nothing at all, and for a passive dual-projector system not only loses approximately ½ brightness, but the viewer sees either only the left eye image or only the right eye image, resulting in a total loss of the stereoscopic 3D effect.

In one embodiment, a dual projection system according to the present invention provides that an alternation between left and right channel images occurs at a frequency that would provide a motion picture quality 3D effect from a single projector after failure of one of the projectors. This occurs at approximately at least once per frame, but some audiences/theaters may find it acceptable at lower rates. For motion picture purposes, the 3D effect is essentially lost at an alternation frequency of approximately once per second or greater.

In one embodiment of a dual projection system, the present invention provides a detection device that notifies a projector in the event of any critical malfunctions in the other projector (e.g., a bulb burnout, or another failure that takes a projector off-line). The detection device is, for example, a light detector in a light path (or just off a light path) in each projector, or Built-In-Test (BIT) equipment already installed in a projector.

A controller of the remaining functioning projector receives a signal indicating the malfunction and then proceeds to adjust one or more parameters of the functioning projector to operate in an optimal single projector active filter configuration. The adjustments may include, for example, an increase in the rate at which left and right images are projected from the projector. Another adjustment may be a change in the format (e.g., change from double flash to triple flash). Another adjustment may be to increase an amount of light produced by the projector (projecting a brighter image).

For example, initially, in a dual projection system, alternation between left and right channel images may occur at a frequency of approximately equal to or less than the frame rate. After one projector is taken off-line (via malfunction or other circumstances), the alternation frequency of the remaining functioning projector is boosted to at least 2-3 times the frame rate. This may be embodied, for example, by changing the format to approximately 4:2 (2× flash), 5:2, or 6:2 (3× flash). The increase in alternation frequency may also be coupled with one or more other adjustments, such as, for example, an increase in brightness of the projected image (e.g., via an increase in a light level of a projection lamp in the remaining functioning projector).

Preferably, the above described adjustment/(s) is/are made automatically by the controller upon detecting a projector loss. In this manner, the dual projection system with both projectors operating normally is tuned for optimal performance in the dual projector configuration, and, in the event of a failure or critical malfunction of one projector, the other projector is quickly re-configured for optimal performance as a single projector without loss of the 3D effect.

Figure 4:
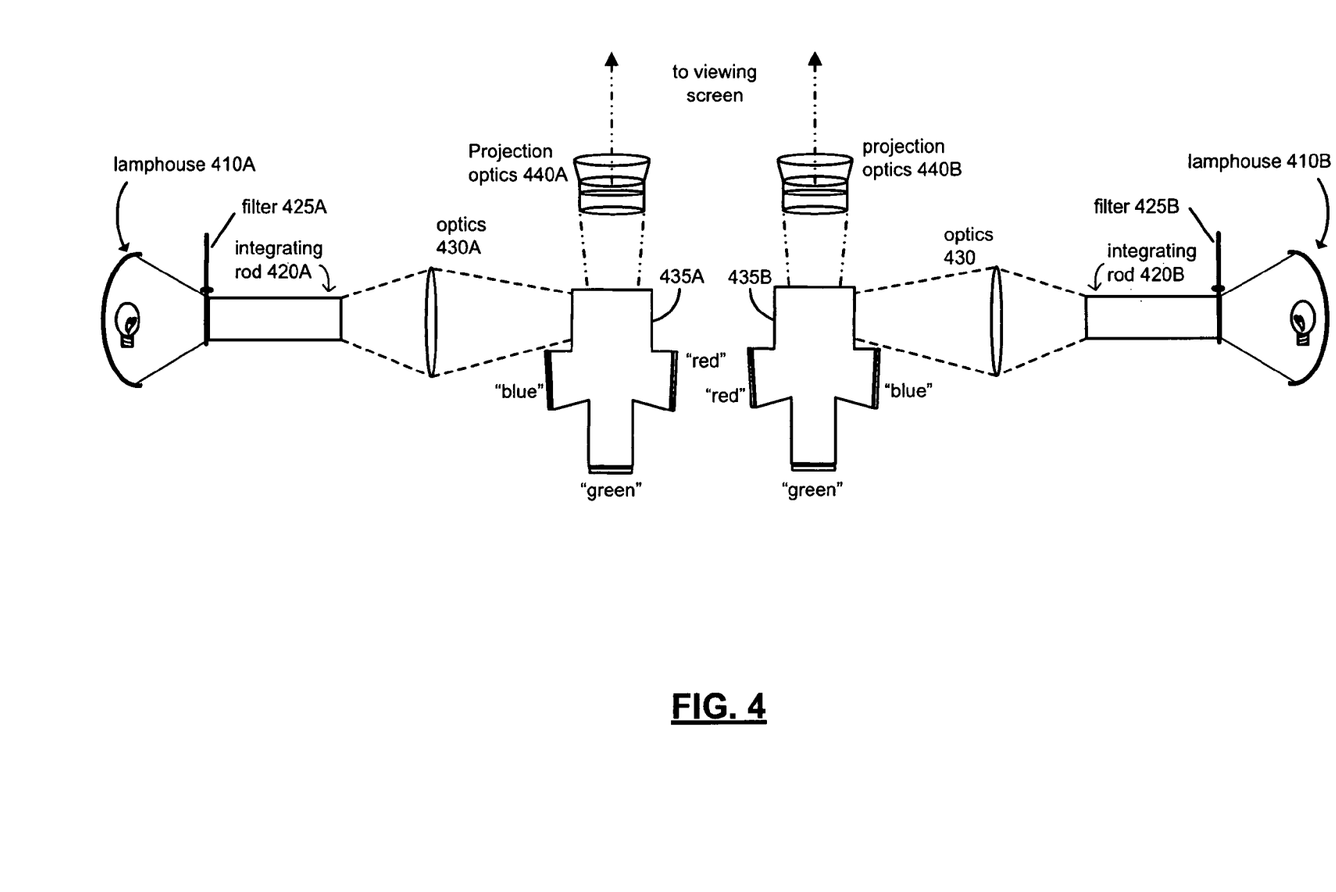
FIG. 4 is an optical schematic of a light path and active filters of an active dual-projection system according to an embodiment of the present invention.

FIG. 4 is an optical schematic of a light path and active filters of an active dual-projection system 400 according to an embodiment of the present invention. Each projection system includes a light path comprising, for example, a lamphouse 410A/B, filter 425A/B, integrating rod 420A/B, optics 430A/B modulator 435A/B, and projection lens 440A/B. Filters 425A/B are, for example, electronically switchable filters. In one embodiment, the filters 425 A/B are rotating wheels that comprise a portion of filter material corresponding to a first channel (e.g., a right eye projection filter) and a portion of filter material corresponding to a second channel (e.g., a left eye projection filter). The filter materials may be, for example, sub-primary color passband filters (e.g., filters each having three sub-primary color passbands), polarization sensitive filters (e.g., linearly polarized or circularly polarized filters), or other filtering techniques.

The filters 425A/B may be identical in construction and are, for example, configured on a rotating mechanism (not shown) in a manner that causes them to be out of phase when operating. The filters are positioned, for example, at an output of the integrating rods 420A/B. Electronics energizing modulation surfaces of the modulators 435A/B are programmed to provide image data of the channel corresponding to the filter material at the output of the integrating rod in the same light path as the modulator. Projection optics 440A and 440B then project the modulated light paths onto a viewing screen.

Figure 5:
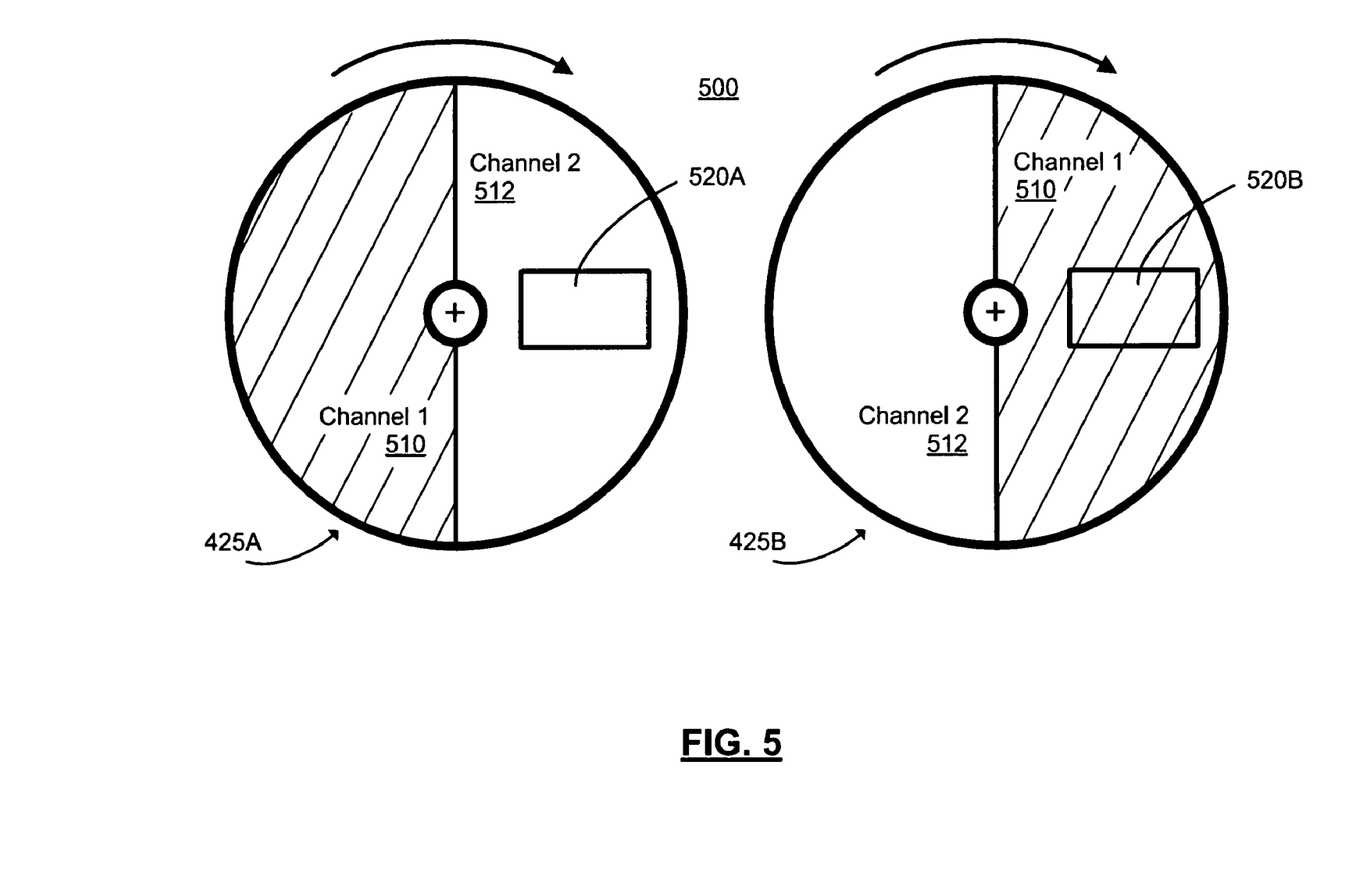
FIG. 5 is a drawing of a pair of inversely synchronized active filters according to an embodiment of the present invention.

FIG. 5 is a drawing of a pair of inversely synchronized (180 degree out-of-phase) active filters 425A/B according to an embodiment of the present invention. Each filter comprises filter material 510 for a first channel and filter material 512 for a second channel. Each filter is positioned at an input of an integrating rod (e.g., integrating rod 420A's input is shown as 520A, and integrating rod 420B's input is shown as 520B). Alternatively, the filters may be positioned at an output of the integrating rod or at other locations of the light path.

Figure 6:
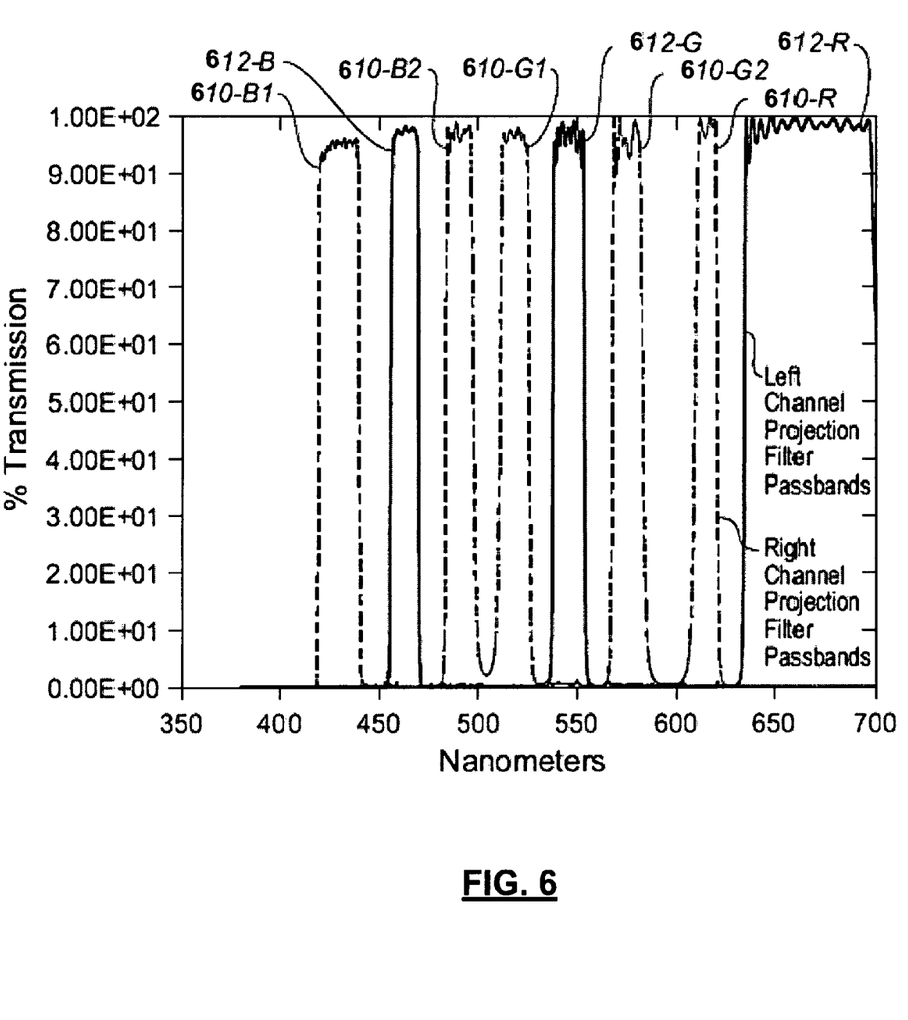
FIG. 6 is a graph of an exemplary set of wavelengths for channel filter materials in an embodiment of the present invention.

In one embodiment, the filters 425A/B comprise filters each having at least one mutually exclusive passband in the wavelengths of each of red, green, and blue light. FIG. 6 is a graph of an exemplary set of wavelengths for channel filter materials in an embodiment of the present invention. As shown, a right channel projection filter (e.g., channel 1) has passband wavelengths of blue at approximately 400 (or up to approximately 420) to 440 (610-B1) and 484 to 498 nm (610-B2), green at 514 to 528 (610-G1) and 567 to 581 nm (610-G2), and red at 610 to 623 nm (610-R). A left channel projection filter has passband wavelengths of blue at 455 to 471 nm (612-B), green at 539 to 556 nm (612-G), and red at 634 to 700 nm (612-R).

Of course other permutations exist, such as, for example, switching the left and right channel wavelengths, or switching the green and blue wavelengths etc. In addition, the passband wavelengths are approximate and each band may vary by, for example +/−5 nm or more. Such variations may occur by shifting the entire passband and/or by selecting one or more different endpoints for the passbands. An important consideration is that such variances should not reduce the guard band between passbands to a level where a system using the filters incurs unacceptable levels of crosstalk between the channels.

In sum, the filters include, for example, at least one band in each of red, green, and blue lights for each of the channels. The filters may include more than one band in a same color and same channel. The filters may also include guard bands between adjacent portions of spectrum in different channels. The filters may also include a notch band between adjacent colors in the same channel. Further discussion of similar channel filters in the context of 3D projection systems is provided by Richards et al., U.S. patent application Ser. No. 11/801,574, Richards et al., U.S. patent application Ser. No. 11/804,602, and Richards et al., U.S. Provisional Patent Application Ser. No. 60/931,320, the contents of each of which are incorporated herein by reference in their entirety.

In another embodiment, the filters comprise polarization filters. Channel 1 is, for example, a right hand circular polarization filter, and channel 2 is, for example, left hand circular polarization filter.

Figure 7:
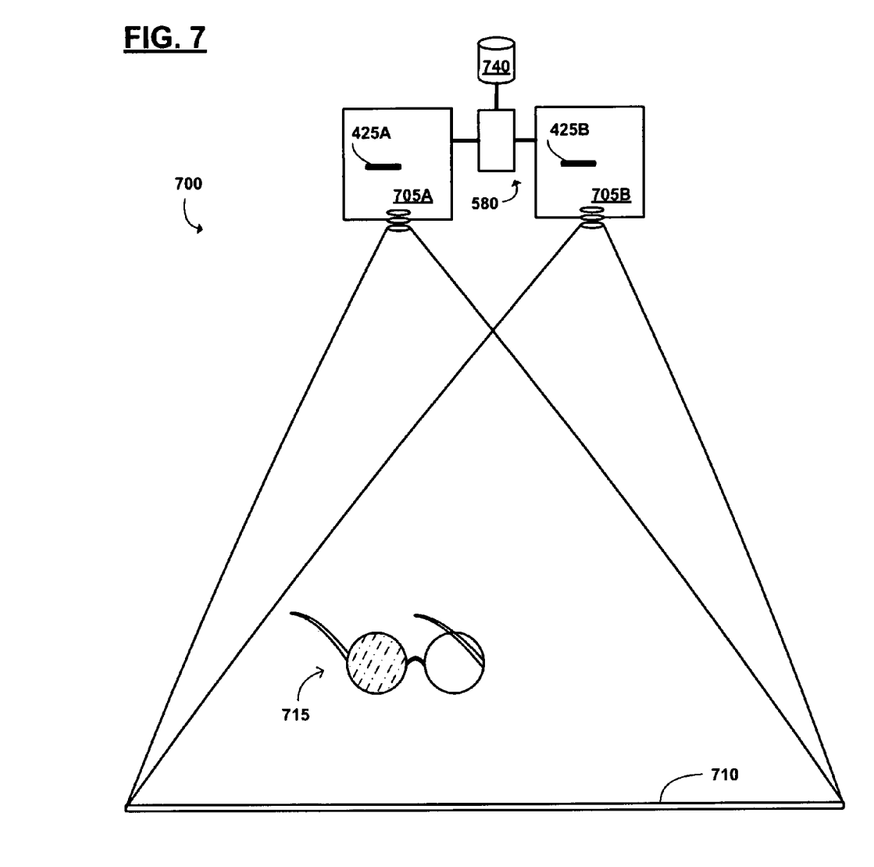
FIG. 7 is a block diagram of a dual projection system according to an embodiment of the present invention.

FIG. 7 is a block diagram of a dual projection system 700 according to an embodiment of the present invention. Left and right channel images are derived, decoded, retrieved, or reconstructed from data stored on disk drive 740 (or received from an appropriate network or transmission reception) by server 780. Color correction as described in the above noted patent applications may also be applied. The color correction, if utilized, is performed, for example, on a channel-by-channel basis and applied to the energizing data of the modulation chip in accordance with which pixels are illuminated by filtered light of the corresponding channel (e.g., pixels illuminated by left channel light have left channel color correction data applied).

The decoded, color corrected (if applicable), left and right channel images are then projected simultaneously from a first projector 705A and a second projector 705B onto screen 710 for viewing through glasses 715. Projection filters 425A/B are constructed, for example, as in any of the above described embodiments or variations/equivalents thereof. The light source of each projector is filtered by its projection filter and then illuminates modulators within the projector.

The illumination onto each modulator in both projectors comprises light with wavelengths that alternate between a left and a right channel. The filters (and modulators) of both projectors are inversely synchronized such that at any given moment, the projectors project different channels.

Glasses 715 include left and right channel viewing filters respectively disposed on left and right lenses of the glasses. The viewing filters are, for example, passbands that encompass each passband of a corresponding channel in the projection filters.

In describing preferred embodiments of the present invention illustrated in the drawings, specific terminology is employed for the sake of clarity. However, the present invention is not intended to be limited to the specific terminology so selected, and it is to be understood that each specific element includes all technical equivalents which operate in a similar manner. Furthermore, the inventors recognize that newly developed technologies not now known may also be substituted for the described parts and still not depart from the scope of the present invention. All described items, including, but not limited to filters, projectors, modulators, screens, content, including image frames and data stored on media, glasses, viewing filters, etc should also be considered in light of any and all available equivalents.

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art based on the present disclosure.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, HD-DVD, Blue-ray, CD-ROMS, CD or DVD RW+/−, micro-drive, and magneto-optical disks, ROMs, RAMs, EPROMs, EEPROMs, DRAMs, VRAMs, flash memory devices (including flash cards, memory sticks), magnetic or optical cards, SIM cards, MEMS, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, synchronization (inverse, in-step, or otherwise) of images, frames, filters, projections of the above, and any time slicing (e.g., double or triple flash implementations), color corrections or other processing of data used to modulate light prior to projection, and the display, storage, or communication of results according to the processes of the present invention.

The present invention may suitably comprise, consist of, or consist essentially of, any of element (the various parts or features of the invention) and their equivalents as described herein. Further, the present invention illustratively disclosed herein may be practiced in the absence of any element, whether or not specifically disclosed herein. Obviously, numerous modifications and variations of the present invention are possible in light of the above teachings. It is therefore to be understood that within the scope of claims to be included in a subsequently filed utility patent application, the invention may be practiced otherwise than as specifically described herein.

What is claimed and desired to be secured by Letters Patent of the United States is:

1. A projection system, comprising:
a first projector configured to alternately project a first channel image of a 3D image and then a second channel image of the 3D image; and
a second projector configured to alternately project the second channel image of the 3D image and then the first channel image of the 3D image;
wherein: the first projector and the second projector are inversely synchronized such that when one projector is projecting a first channel image the other projector is projecting a second channel image and visa versa:
the first projector projects the first channel image in a first set of red, green, and blue wavelengths separate and distinct from a second set of wavelengths used to project the second channel image; and
the wavelengths used to project the first and second wavelength sets comprise narrowband light sources having a full width at half maximum of less than 25 nm.

2. The projection system according to claim 1, wherein the first channel comprises a right channel of a 3D image and the second channel comprises a left channel of the 3D image.

3. The projection system according to claim 1, wherein the first channel filter and the second channel filter are 180 degrees out of phase.

4. The projection system according to claim 1, wherein the alternation between left and right channel images occurs at frame changes.

5. The projection system according to claim 1, wherein the alternation between left and right channel images occurs approximately once per frame change.

6. The projection system according to claim 1, wherein the alternation between left and right channel images occurs more than once per frame change.

7. The projection system according to claim 1, wherein the alternation between left and right channel images occurs at a frequency that would provide a motion picture quality 3D effect from a single projector after failure of one of the projectors.

8. The projection system according to claim 1, wherein:
the first projector comprises an electronically switchable filter comprising a first filter synchronized to the projection of first channel images from the first projector and a second filter synchronized to the projection of second channel images from the first projector; and
the second projector comprises an electronically switchable filter comprising a first filter synchronized to the projection of first channel images from the second projector and a second filter synchronized to the projection of second channel images from the second projector.

9. The projection system according to claim 8, wherein the filters are spectral separation filters.

10. The projection system according to claim 8, wherein the filters are circularly polarized.

11. The projection system according to claim 8, wherein the filters synchronized to the projection of first channel images comprises a circular polarization filter of a first handedness, and the filters synchronized to the projection of the second channel images comprises a circular polarization filter of a second handedness.

12. The projection system according to claim 1, wherein the images are color corrected images formed on a channel-by-channel basis via color corrected data energizing a modulator in accordance with narrowband lights illuminating the modulator.

13. The projection system according to claim 1, wherein the images are projected in first and second sets of lights comprising narrowband red, green, and blue lights having a full-width at half max of less than 25 nm.

14. The projection system according to claim 13, wherein the first and second sets of lights are separated by polarization.

15. A projection system, comprising:
a first projector configured to alternately project at least one first channel image and then at least one second channel image; and
a second projector configured to alternately project at least one second channel image and then at least one first channel image;
wherein:
the first projector comprises a first spinning wheel filter comprising a first channel filter and a second channel filter; and
the second projector comprises a second spinning wheel filter comprising a first channel filter and a second channel filter;
wherein the first channel filter and the second channel filter do not spin in synchronicity.

16. The projection system according to claim 15, wherein the channel filters comprise spectral separation filters.

17. The projection system according to claim 16, wherein the spectral separation filters comprise a set of first channel passbands configured to pass light, a set of second channel passbands configured to pass light, and a set of guard bands configured to block light between adjacent passbands of different channels.

18. The projection system according to claim 17, wherein the spectral separation filters further comprise at least one notch band between adjacent colors of a same channel configured to block light between the adjacent colors in that channel.

19. The projection system according to claim 16, wherein at least one of the spectral separation filters comprises three passbands of visible light, a first passband configured to pass only a first color of light, a second passband configured to pass two spectrum adjacent colors of light comprising the first color of light and a second color of light, and a third passband configured to pass two spectrum adjacent colors of light comprising the second color of light and a third color of light.

20. The filter according to claim 19, wherein at least one of the passbands passing spectrum adjacent colors of light includes a notch that separates the spectrum adjacent colors and is not passed by the passband.

21. The projection system according to claim 16, wherein a first of the spectral separation filters comprises passbands of wavelengths of approximately 400 to 440 nm, 484 to 498 nm, 514 to 528 nm, 567 to 581 nm, and 610 to 623 nm.

22. The projection system according to claim 16, wherein one of the spectral separation filters comprises wavelengths of approximately 455 to 471 nm, 539 to 556 nm, and 634 to 700 nm.

23. The projection system according to claim 13, further comprising viewing glasses comprising filters having passbands encompassing the narrowband red, green, and blue lights.

24. The projection system according to claim 23, wherein the first and second sets of lights are spectrally separated.

25. The projection system according to claim 24, wherein the channels are blue shifted relative to the viewing filters.

26. The projection system according to claim 15, wherein the channel filters comprise polarization filters.

27. The projection system according to claim 15, wherein the images are color corrected images formed on a channel-by-channel basis via color corrected data energizing a modulator in accordance with narrowband lights illuminating the modulator.

28. The projection system according to claim 15, wherein the images are projected in first and second sets of lights comprising narrowband red, green, and blue lights having a full-width at half max of less than 25 nm.

29. The projection system according to claim 28, wherein the first and second sets of lights are spectrally separated.

30. The projection system according to claim 29, further comprising viewing filters having passbands encompassing the spectrally separated narraowband lights.

31. The projection system according to claim 30, wherein the passbands are shifted relative to the narrowband lights.

32. The projection system according to claim 31, wherein the shift comprises a blue shift of the first and second channel images relative to the viewing filters.

33. The projection system according to claim 28, wherein the first and second sets of lights are separated by polarization.

34. A method for stereoscopic three-dimensional projection comprising:
- receiving a first sequence of images intended for reception by a viewer's left eye;
- receiving a second sequence of images intended for reception by a viewer's right eye;
- generating a third sequence of images comprising alternating images from said first and said second sequences of images;
- filtering said third sequence of images using a first actively controlled filter with at least two states;
- projecting from a first projector the filtered third sequence of images;
- controlling the first actively controlled filter so as to be in a first state when said first projector is projecting an image from said first sequence and in a second state when said first projector is projecting an image from said second sequence;
- generating a fourth sequence of images comprising alternating images from said first and said second sequences of images;
- filtering said fourth sequence of images using a second actively controlled filter with at least two states;
- projecting from a second projector the filtered fourth sequence of images; and
- controlling the second actively controlled filter so as to be in a first state when said second projector is projecting an image from said first sequence and in a second state when said second projector is projecting an image from said second sequence.

35. The method according to claim 34, wherein said fourth sequence of images differs from said third sequence of images.

36. The method according to claim 34, wherein the first state of the actively controlled filters comprises a first hand polarization, and the second state of the actively controlled filters comprises a second hand polarization opposite to the first hand.

37. The method according to claim 34, wherein a first state of the actively controlled filters comprises a filter comprising a first set of sub-primary passbands and a second state of the actively controlled filters comprises a filter comprising a second set of sub-primary passbands.

38. The method according to claim 37, wherein the first set of sub-primary color passbands comprises passbands in portions of red, green, and blue light wavelengths.

39. The method according to claim 37, wherein the first set of sub-primary passbands and the second set of sub-primary color passbands are mutually exclusive.

40. The method according to claim 34, wherein the images are alternated one or more times in each frame.

41. The method according to claim 34, wherein the images are alternated consistent with at least one of 1:1, 2:2, 4:2, 5:2, and 6:2 formats.

42. The method according to claim 34, wherein the images are projected in first and second sets of lightbands comprising narrowband red, green, and blue lights having a full-width at half max of less than 25 nm.

43. The method according to claim 42, further comprising the step of viewing the projected images with glasses having passbands encompassing, and shifted relative to, the lightbands.

44. The method according to claim 42, wherein the first and second sets of lightbands are spectrally separated.

45. The method according to claim 42, wherein the first and second sets of lightbands are separated by polarization.

46. A method, comprising the steps of:
- displaying alternating images of a first channel and a second channel via a first display device; and
- displaying alternating images of a first channel and a second channel via a second display device;
- wherein the alternating images of the first display device are inversely synchronized to the alternating images of the second display device such that when the first display device is displaying a first channel image, the second display device is displaying a second channel image and visa versa;
- wherein the images of the first and second channels are respectively displayed in first and second sets of lightbands comprise narrowband red, green, and blue lights having a full-width at half max of less than 25 nm; and
- wherein the displayed first and second channel images are displayed on a same space of a display screen such that the images over time overlap on the display screen.

47. The method according to claim 46, wherein the display devices are D-Cinema projectors.

48. The method according to claim 46, wherein the first display device comprises a first projector having a filter with two states, a first state having properties consistent with the first channel and synchronized to filter first channel images projected by the first projector and a second state having properties consistent with the second channel and synchronized to filter second channel images projected by the first projector.

49. The method according to claim 46, wherein the lights comprise mutually exclusive spectrally separated lights.

50. The method according to claim 46, wherein the lights comprise lights of mutually exclusive polarization.

51. The method according to claim 46, wherein the color corrected images are formed on a channel-by-channel basis in a step of applying color corrected energizing data to a modulation chip in accordance with narrowband light illuminating the modulator.

* * * * *